Patented Nov. 25, 1952

2,619,481

UNITED STATES PATENT OFFICE 2,619,481

CURING RUBBERY OLEFINIC COPOLYMERS

Francis P. Baldwin, Linden, and Winthrope C. Smith, Westfield, N. J., assignors to Standard Oil Development Company, a corporation of Delaware No Drawing. Application April 28, 1949, Serial No. 90,283

6 Claims. (Cl. 260—79.5)

This invention relates to rubbery olefinic low temperature copolymers, relates especially to curing methods for rubbery olefinic copolymers, and relates particularly to curing methods utilizing quinone dioximes for the curing with thiazole type compounds (and sulfur if desired) to accelerate the dioxime curing reaction and simultaneously to reduce the scorchiness inherent in the dioxime curing process.

It has been found possible to produce a very valuable elastomer by the copolymerization of isobutylene with a multiolefin at temperatures ranging from about $-40°$ C., down to about $-164°$ C., by the application to the cold olefinic mixture, preferably in the presence of an appropriate diluent, of a solution of a Friedel-Crafts active metal halide catalyst such as aluminum chloride in methyl chloride to yield a copolymer having low but significant amounts of residual olefinic unsaturation in the molecule as indicated by iodine numbers ranging from 0.5 to 175, preferably to about 5 and 100, with Staudinger molecular weight numbers within the range between about 30,000 and about 80,000 (or higher as desired, up to about 250,000), which are capable of a curing reaction to establish in the polymer a definite elastic limit, usually within the range between 500% and 1200% elongation at break, with a tensile strength at break within the range between 1500 lbs., and 4500 lbs., per square inch.

The low unsaturation of this polymer, however, results in a relatively slow curing rate. The polymer can be cured with sulfur alone, but the curing temperature and time are so great as to yield a very serious molecular weight break-down, and even with the most powerful of ultra accelerators, the curing time with sulfur and the accelerator still is unduly long for many commercial purposes.

The polymer can be excellently cured with a quinone dioxime and lead dioxide, such as para-quinone dioxime and its various analogues, homologues and esters, and such curing is rapid and highly effective and efficient. However, the difficulty is encountered that polymer compounds containing the dioximes and lead oxides (as shown in Haworth Patent No. 2,393,321) are extremely "scorchy" on the mill, so much so that at such milling temperatures of approximately 215° to 230° F., the milling time required to get a good dispersion of pigments, additives, etc., in the polymer substance is such that the material may "set up" on the mill into a nearly fully cured mixture, which cannot then be caused to flow sufficiently to fill mold contours or to obtain other desired shapes in the cured polymer. This characteristic of the quinone dioximes has seriously restricted their usefulness.

It has been found that the quinone dioximes alone yield a curing reaction which is quite slow, so slow as to be commercially unsatisfactory, and it has been found that the presence of oxidizing agents, particularly the metal peroxides, greatly speeds up the reaction, and some workers have considered that the presence of oxidizing agents is necessary for any curing reaction. The present invention has, however, shown that oxidizing agents are not necessary.

According to the present invention, oxidizing agents such as metal peroxides and other oxidizing agents are discarded from the compounding recipe, and instead, a substantial portion of a thiazole compound, with or without sulfur as desired, is incorporated into the polymer. This procedure results in a curing effect, which is in every respect, the equal of the curing obtainable by the dioximes with metal oxides such as lead peroxide, including tightness of cure, modulus, elastic limit, speed of curing and the like, and in addition the scorchiness wholly disappears, or is reduced to an insignificant amount. Accordingly, the discovery that thiazole type of sulfur compounds not only would speed up the curing reaction with the quinones, but also would destroy entirely the tendency towards scorchiness at milling temperatures is most unexpected.

It may be noted, however, that the reaction does not go with sulfur compounds generally, but only with sulfur compounds having definite structural configurations, which may be identified broadly as the thiazole type of compounds.

Of the group of quinone dioxime compounds, many will show an adequate curing reaction alone, but a few are inactive alone. However, it is found that all of the quinone dioximes cure more rapidly, more satisfactorily and somewhat more efficiently if there is present an oxidizing agent. The most convenient oxidizing agent is lead dioxide, since the presence of small amounts of lead pigment is helpful in the cured polymer, and it had not been previously found that any other type of compounds than the metal oxides would produce any analogous speeding up and improving effect in the curing reaction. Accordingly, the discovery that these thiazole type compounds would improve the curing and at the same time substantially completely remove any tendency towards scorchiness, was most unexpected.

It may be noted that of these compounds the primary characteristic is the presence of a thiazole group:

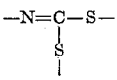

The presence of this group is found to be a necessary condition for the functioning of the thiazole compounds, but it is not necessarily a sufficient condition for satisfactory activity. Accordingly, it is further found that the operative compounds must contain the following structure:

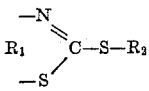

where $R_1$ is an aromatic radical and $R_2$ may be defined as follows:

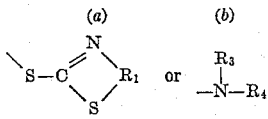

in which $R_1$ may be another aromatic radical and $R_3$ and $R_4$ may be hydrogen or aromatic or aliphatic substituents. It is also essential that the nitrogen to which $R_3$ and $R_4$ are attached be trivalent and not pentavalent.

Thus, the invention cures the low temperature copolymer of isobutylene with a multiolefin by mixing therewith a portion of a quinone dioxime compound within the range between approximately 1% and 5%, depending to some extent upon the iodine number of the polymer, together with a significant quantity of a thiazole type compound, and a proportional amount of sulfur if desired. The compound desirably includes also such substances as stearic acid, zinc oxide, carbon black, and the like, including all of the substances which are customarily added to a compounding recipe. This mixture is conveniently prepared either on the double roll mill, in the Banbury mixer, in a kneader, or the like as desired. It is, of course, common that the mixing be done at an elevated temperature which is usually between 160° F., and 240° F. It is found that mixing may be conducted in the conventional manner without the occurrence of any scorchiness, or any modification of the uncured condition of the polymer. The mixture may then be formed into the desired structure without interference from pre-curing, and then cured normally by a few minutes' heating to temperatures within the range between 260° F. and 400° F. The method of preparation and characteristics of this polymer as prepared with iodine numbers within the range between 0.5 and 50 is well shown in U. S. Patents Nos. 2,356,127-8, and the method of preparation and properties of the polymer having iodine numbers within the range between 50 to 60 and 175 is well shown in U. S. patent application Serial No. 788,640, filed November 28, 1947, all three of which are herewith made parts of the present disclosure.

Other objects and details of the invention will be apparent from the following description.

The primary raw material for the present invention is the low temperature copolymer of isobutylene with a multiolefin. In preparing this low temperature copolymer, a mixture is prepared consisting of from about 30 to 99.5 parts of isobutylene of good purity, preferably of a purity from 96 to 99.5%, with from 0.5 part to about 70 parts of a multiolefin having from 4 to 14, inclusive, carbon atoms per molecule; conjugated diolefins of 4 to 6 carbon atoms such as butadiene, isoprene, piperylene, dimethyl butadiene, and other multiolefins such as dimethallyl, myrcene, 2-methyl, 3-nonyl butadiene 1-3, and the like being particularly suitable. It may be noted that any hydrocarbon containing two or more units of ethylenic unsaturation is useful in this reaction, and it is not significant whether the unsaturation is conjugated or non-conjugated, nor what the configuration of the molecule is, whether linear or branched, nor is it necessary that aromatic substituents be avoided. Compounds having one unit of unsaturation in the 2-position with a methyl group on the two-carbon copolymerize better than do other compounds, but there is no more than a small difference in ease of copolymerization, and generally there is only a minor difference in the copolymerizability ratio among the various multiolefinic compounds.

The mixture of isobutylene and multiolefin is polymerized at a reduced temperature, below 0° C., and within the range between 0° C. and −164° C. The preferred range is from −40° C., as set by liquid propane to −103° C., as set by liquid ethylene, temperatures of −88° as set by liquid ethane, and −77° as set by solid carbon dioxide also being advantageous. The reduced temperature may be obtained by a refrigerating jacket upon a reactor, in which case any desired refrigerant which will give an appropriate temperature may be used, or the desired low temperature may be obtained by the addition of the refrigerant to the copolymerizate mixture, in which instance only refrigerants which do not interfere with the reaction may be used, the principal ones being liquid methane, liquid ethylene, liquid ethane, liquid or solid carbon dioxide, liquid propane and a small number of the fluoro or fluoro-chloro-substituted aliphatics.

The polymerization is conducted by a liquid Friedel-Crafts active metal halide material which may conveniently be any of the Friedel-Crafts catalyst disclosed by N. O. Calloway in his article on the "Friedel-Crafts Synthesis," printed in the issue of "Chemical Reviews," published for the American Chemical Society at Baltimore in 1935, in volume XVII, No. 3, the article beginning on page 327, the list being particularly well shown in page 375, in solution in a low freezing non-complex forming solvent.

To be low-freezing, it is merely necessary that the solvent have a freezing point below 0° C., since even when the freezing point is above the polymerization temperature, the catalyst solution dissolves in the cold reaction mixture without interference from solidification.

To be non-complex forming, it is only necessary that no stable compound be formed between the solvent and the metal halide, such as to produce a substantial change in boiling point. In general, it is possible to recover the whole of the solute from the solution at a temperature within one or two degrees of the boiling point of the pure solvent, and that instillation of the solvent to the solute or distillation of the solvent away from the solute yields a smooth change in temperature of condensation or vaporization.

It may be noted that titanium tetrachloride, which is liquid at room temperature, may be used directly, but is usable with all of the multiolefins when dissolved in an appropriate solvent.

It may also be noted that the lower boiling hydrocarbons up to 6 or 7 carbon atoms per molecule, are usable as solvents with some of the metal halides, such as the bromides particularly. Also, all of the halo-substituted aliphatic compounds having freezing points below 0° C., are useful without regard to the presence or absence of ethylenic unsaturation in the molecule, since the presence of the halo-substituent so greatly reduces the polymerizability as to permit of the use of halogen-substituted unsaturates as solvents. The preferred solvents are such compounds as ethane, methyl and ethyl chloride, ethylene dichloride, chloroform, ethylidene fluoride, especially with boron fluoride, carbon disulfide, sulfuryl chloride and the like.

The active polymerization catalyst is conveniently added to the cold polymerizate mixture in any convenient way such as in the form of a spray applied to the surface of the rapidly stirred cold olefinic material, or in the form of a high pressure jet into the body of the rapidly stirred cold olefins.

The polymerization proceeds with extreme speed, and in batch reactions may be completed in from a fraction of a second to 10 seconds. In continuous processes where large quantities of cold olefinic materials are used with a jet of polymer solution strongly stirred in; the reaction, insofar as it can be conducted by any given portion of catalyst solution, is extremely rapid, again a matter of a few seconds or less, until the catalyst potency is spent, whereupon the reaction ceases until further quantities of catalyst are added to polymerize added quantities of reactant.

The resulting polymer must have a Staudinger molecular weight number above about 20,000 to be curable, and preferably, has a Staudinger molecular weight number within the range between about 30,000 and 60,000 for optimum strength and ease of processing. That is, when the Staudinger number is below 20,000, the material does not cure to yield a measurable tensile strength, and above about 80,000 the polymer is so tough and leathery that processing and milling become extremely difficult.

The polymer may have an iodine number (by the Wijs method) within the range between about 0.5 and 175, although for convenience of manufacture and ease of processing the iodine number preferably lies within the range between about 5 and 60, since lower iodine number polymers, when cured, may show residual traces of cold flow, and iodine numbers above 60 to 100 are more difficult to make commercially. The resulting polymer also is readily reactive with sulfur, especially in the presence of a sulfurization aid, and with the quinones to yield a cured material having elongation at break within the range between 500% and 1200%, and tensile strength at break within the range between 500 lbs., and 3500 lbs., per square inch, together with a phenomenally high resistance to ozone, acid, alkali and many solvents.

The second component of the invention is a para-quinone dioxime substance as shown in Haworth Patent No. 2,393,321, and includes any of the dioxime type substances containing a quinonoid nucleus as listed by Haworth and any of the esters of the dioxime compounds. This is the primary curing agent. For most curing reactions the dioxime itself is preferred. Many modifications have been tried and offered and many of them work excellently. However, all are difficult to prepare and expensive compared to the para-quinone dioxime, and accordingly for large scale commercial use the simple quinone dioxime is the preferred substance.

The third component of the composition of the invention then is a thiazole type of substance. The preferred compounds are the 2,2'benzo thiazyl disulfide and benzothiazyl 2-mono-cyclohexyl-sulfenamide. These compounds are added to the recipe in the usual way, along with the dioxime and it is found that mixing and milling can be conducted according to standard practice without any special care to avoid scorchiness.

To the mixture there may then be added varying amounts of sulfur if desired, which may in some instances, give a somewhat higher state of cure, especially under conditions of prolonged heating. The usual additives are desirably incorporated including from 1 to 10 parts of stearic acid; from 1 to 20 parts of zinc oxide, and one or more re-inforcing pigments, which may be from 5% to 200% of carbon black, or may be any of the ordinary filler pigments such as barytes, whiting, talcum, chalk, lithopone, clay, chrome pigments, and the like. There may also be added in some instances various of the organic fillers such as ground cork, cotton linters or wood flour or other fibers.

The composition is conveniently prepared on any of the customary milling devices such as the double roll mill, the Banbury mixer, the Werner and Phleiderer mixer and the like, preferably at customary temperatures, since at these temperatures there is no scorchiness and no tendency toward a premature cure. A typical recipe is the following:

| | Parts |
|---|---|
| Elastomer (polymer) | 100 |
| Stearic acid | 3 |
| Zinc oxide | 5 |
| Carbon black | 10 |
| Para-quinone dioxime | 1½ |

The compound presented in this recipe is conveniently prepared by first placing the polymer on the mill and milling it until it is warm enough to be plastic, or until it "bands." The stearic acid, zinc oxide, pigment and carbon black are then added and milled in at leisure. The mill may then desirably be cooled somewhat if the temperature is above about 220° F., and the dioxime and thiazole added. At temperatures below 220°, the milling may be continued for time intervals of from 10 to 20 or 25 minutes without any tendency to scorching.

The finished compound may then be placed in the molds and cured under pressure at temperatures ranging from 260° F., to 400° F., for an appropriate length of time. At temperatures of from 307° F., to 325° F., the cure is substantially complete in time intervals of 10 minutes or less, depending upon the temperature and the amount of curing agent present. The resulting cured specimen may then show a tensile strength within the range between 500 lbs., and 3500 lbs., per square inch, depending upon the presence and amount of the pigment used, with an elongation at break ranging at 200% to 1200%.

EXAMPLE 1

In the testing of this invention, using the quinonoid type of curing procedures for the low temperature copolymer of isobutylene with a diolefin, two sulfur compounds (which were widely used commercially as accelerators for the sulfur curing of natural rubber) were helpful in the processing of the low temperature polymer when it was cured with the quinonoid compounds and were found to exert a pronounced activating effect on paraquinone dioxime. These compounds were 2,2' benzo-thiazyl disulfide (Altax) and benzo-thiazyl 2 - mono - cyclo-hexyl-sulfenamide (Santocure) and the effect was most unexpected since it had previously been considered that efficient curing by para-quinone dioxime required the presence of an oxidizing agent such as lead dioxide, manganese dioxide and the like, and these sulfur compounds are certainly not oxidizing agents in the ordinary meaning of the word. Accordingly, an attempt was made to establish the essential structural features of the sulfur compounds which exert this strong activating effect as shown in the sub-joined Table I.

and

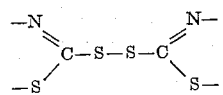

Also, it is found that one of the necessary conditions for activity is the presence of a group comprising

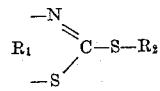

where $R_1$ is aromatic and $R_2$ will be defined later.
As an example of this we may examine the

TABLE I

| Compound No. | 1 | 2 | 3 | 4 | 5 | 6 | 7 | 8 | 9 | 10 | 11 |
|---|---|---|---|---|---|---|---|---|---|---|---|
| Polymer | 100.0 | 100.0 | 100.0 | 100.0 | 100.0 | 100.0 | 100.0 | 100.0 | 100.0 | 100.0 | 100.0 |
| Zinc oxide | 5.0 | 5.0 | 5.0 | 5.0 | 5.0 | 5.0 | 5.0 | 5.0 | 5.0 | 5.0 | 5.0 |
| Stearic acid | 2.0 | 2.0 | 2.0 | 2.0 | 2.0 | 2.0 | 2.0 | 2.0 | 2.0 | 2.0 | 2.0 |
| p-Quinone dioxime | 2.0 | 2.0 | 2.0 | 2.0 | 2.0 | 2.0 | 2.0 | 2.0 | 2.0 | 2.0 | 2.0 |
| Thermal black | 50.0 | 50.0 | 50.0 | 50.0 | 50.0 | 50.0 | 50.0 | 50.0 | 50.0 | 50.0 | 50.0 |
| 2-mercapto benzothiazole | | 4.0 | | | | | | | | | |
| 85% bis-4,5-dimethyl thiazyl disulfide. 15% bis-4-ethyl thiazyl disulfide | | | 4.0 | | | | | | | | |
| 2,2'benzothiazyl disulfide | | | | 4.0 | | | | | | | |
| Zinc benzothiazyl sulfide | | | | | 4.0 | | | | | | |
| Phenylamino methyl 2-benzothiazyl sulfide | | | | | | 4.0 | | | | | |
| Bis-N,N'(2-benzothiazyl thiomethyl) urea | | | | | | | 4.0 | | | | |
| Benzoyl 2-benzothiazyl sulfide | | | | | | | | 4.0 | | | |
| Benzyl hexamethylene tetrammonium 2-benzothiazyl sulfide | | | | | | | | | 4.0 | | |
| 2-mercaptothiazoline | | | | | | | | | | 4.0 | |
| Benzothiazyl 2-monocyclohexyl sulfenamide | | | | | | | | | | | 4.0 |
| Cured 30'/287° F.: | | | | | | | | | | | |
| Tensile strength | 505 | Blistered | 280 | 1,075 | Blistered | Blistered | 465 | 340 | 305 | Blistered | 985 |
| Modulus at 300% E | 25 | No cure | 25 | 285 | No cure | No cure | 25 | 25 | 25 | No cure | 110 |
| Percent elongation | >1,100 | | >1,100 | 800 | | | >1,100 | >1,100 | >1,100 | | 875 |

> indicates that the elongation at break was more than 1,100%, but unmeasurable because the range of the testing machine did not extend beyond 1,100%.

The compounds shown in the recipes of Table I were prepared in a laboratory mill and cured for 30 minutes at 287° F., in a mold under pressure. Recorded in this table are the tensile strengths and elongations produced from the cured specimens, together with the chemical names of the sulfur compounds used to activate the cure. It will be noted that some slight cure is effected by the para-quinone dioxime in the absence of organic activations and this is undoubtedly due to the mild oxidizing effect of oxygen adsorbed on the carbon black particles. It will be further noted that of the activating materials tried, only the 2,2'benzothiazyl disulfide and the benzothiazyl 2-monocyclo-hexyl sulfenamide produced tensile strengths greated than that exhibited by the control compound.

Since all of the materials have in their make-up the chemical aggregation

it is obvious that this aggregation, although a necessary condition for the functioning of the material, it is not a sufficient condition for activity. In similar fashion, we may eliminate from considerations, insofar as sufficiently is concerned, the following aggregations:

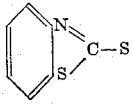

compound prepared with 85% bis-4,5-dimethyl thiazyl disulfide and 15% bis 4-ethyl thiazyl disulfide and 2-mercapto thiazoline (compounds 3 and 10) in which $R_1$ is not aromatic and which rather than activating the cure, retard it, as compared to the compounds prepared with 2,2'benzothiazyl disulfide and benzothiazyl 2-monocyclohexyl sulfenamide (compounds 4 and 11), in which $R_1$ is aromatic and which functions as an activator.

This establishes the necessity of the presence of

in the compound, where $R_1$ is aromatic. To define $R_2$, examination of the data will reveal that $R_2$ must be defined as follows:

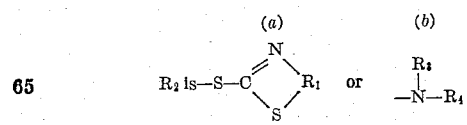

This necessity is proven by comparison of the data obtained utilizing 2-mercapto benzothiazole (compound 2), phenylamino methyl 2-benzothiazyl disulfide (compound 6), bis-N,N' (2-benzothiomethyl) urea (compound 7), benzoyl 2-benzothiazyl sulfide (compound 8), and benzyl hexamethylene tetrammonium 2-benzothiazyl sulfide (compound 9), in which $R_2$ does not conform to the requirement and which either do nothing or retard the cure as compared with the data obtained on the compounds prepared with 2,2'benzothiazyl disulfide (compound 4) and benzothiazyl 2-monocyclohexyl sulfenamide (compound 11) both of which incorporate an $R_2$ as specified, and both of which act as cure activators.

The necessity of the trivalency of the nitrogen in $R_2$ (b) is adequately portrayed in the comparison between the compounds containing benzyl-hexamethylene tetrammonium 2-benzothiazyl sulfide (compound 9) where N is pentavalent and which does not function as an activator as compared to benzothiazyl 2-mono-cyclohexyl sulfenamide (compound 11), where N is trivalent and which does exhibit the sought for activation.

Although data are shown to illustrate only that $R_3$ may be hydrogen and that $R_4$ may be cycloaliphatic, it is found that both $R_3$ and $R_4$ may be hydrogen, aliphatic or aromatic, since it appears that the required specification is only that $R_3$ and $R_4$ be attached to trivalent nitrogen to adequately define $R_2$ (b).

The data upon which this discussion and proof is based is set out in Table I. It will be noted that Table I shows the preparation of eleven compounds, utilizing various of the organic sulfides. It may be noted that the first compound contained the copolymer with 5 parts of zinc oxide, 2 of stearic acid, 50 of carbon black, and 2 of para-quinone dioxime. Upon heating to 287° F., for 30 minutes, substantially no tensile strength was developed, the modulus was extremely low and the elongation very high. The compounds prepared from the 10 organic sulfides show in the first one a badly blistered sheet which was soluble in hydrocarbon solvents; in the second, a very low tensile strength and low modulus and an unlimited elongation. The third one (column 4) showed a tensile strength of over a thousand, a modulus of 285, and an elongation at break of 800%. The 4th and 5th compounds (columns 5 and 6) blistered and did not cure; remaining completely soluble in hydrocarbon solvents. The 6th, 7th and 8th showed some curing properties, but not adequate and did not show a satisfactory state of cure. The 9th (column 10) showed no cure whatever and the material was completely soluble in hydrocarbon solvents, whereas the 10th (column 11) showed a reasonably good cure.

These results are summarized in Table II.

TABLE II

| | Percent swell in naphtha |
|---|---|
| (1) No accelerator | 1,625. |
| (2) Captax — 2-mercapto benzothiazole | Dissolved. |
| (3) Erie — 85% bis-4,5-dimethyl thiazyl disulfide, 15% bis-4-ethyl thiazyl disulfide | 570. |

TABLE II—Continued.

| | Percent swell in naphtha |
|---|---|
| (4) Altax — 2,2'benzothiazyl disulfide | 363. |
| (5) OXAF — Zinc benzothiazyl sulfide | Dissolved. |
| (6) BJF — Phenylamino methyl 2-benzothiazyl sulfide | Do. |
| (7) El-sixty — Bis-N,N'(2-benzothiazyl thiomethyl) urea | 1,302. |
| (8) Ureka C — Benzoyl 2-benzothiazyl sulfide | 977. |
| (9) Acrin — Benzyl hexomethylene tetrammonium 2-benzothiazyl sulfide | 1,418. |
| (10) ZMT — 2-mercapto-thiazoline | Dissolved. |
| (11) Santocure — Benzothiazyl 2-mono-cyclo-hexyl sulfenamide | 447. |

This table shows the condition of cure, in terms of the percent of swell of the heat-treated sample in light naphtha. It will be noted that line 1, corresponding to column 1 showed a percent swell of 1625, that line 2 dissolved, that line 3 showed a percent swell of 570, that line 4 showed a percent swell of 363, relatively very low and so on, with line 11 showing a percent swell of 477, nearly as good as line 4. These results further show the excellent state of cure obtainable by two of the ten organic sulfides listed.

Similar, but less detailed tests which are not here reported, show the applicability of the above analysis to indicate the type of compound applicable in this invention, and show the relatively wide range of compounds in the useful family.

EXAMPLE 2

Recipes as shown in the sub-joined Table III were prepared on the open roll mill, the polymer being placed on the warm mill, milled until it "banded," and then the other substances added. The first recipe contained no sulfur, and the second recipe contained 1.5 parts of sulfur as shown. When the compounding was complete, samples were cured for 10 minutes, 20 minutes, 40 minutes and 80 minutes at 287° F., under press pressure and determinations were then made of the tensile strength, elongation at break and modulus at 300%.

TABLE III

| | | |
|---|---|---|
| Polymer | 100.0 | 100.0 |
| Zinc oxide | 5.0 | 5.0 |
| Stearic acid | 1.0 | 1.0 |
| SRF black | 50.0 | 50.0 |
| VB-1 (p-quinone dioxime) | 2.0 | 2.0 |
| Altax (2,2'benzothiazyl disulfide) | 4.81 | 4.81 |
| Sulfur | | 1.5 |
| Tensile—elong.—modulus at 300: | | |
| Cured 10'/287° F | 1270-740-495 | 1290-700-435 |
| Cured 20'/287° F | 1295-740-580 | 1365-720-500 |
| Cured 40'/287° F | 1260-730-665 | 1450-720-595 |
| Cured 80'/287° F | 1275-660-695 | 1470-670-730 |

It will be noted that the first column shows the excellent results with Altax alone, and the second column shows the equally satisfactory results with small added amounts of sulfur. It will be noted that with the presence of sulfur, the curing is a little slower, but the final state of cure distinctly better. As shown in this and subsequent examples, the added sulfur is useful in amounts ranging from about 0.5 to 2 parts per 100 parts of polymer.

EXAMPLE 3

A similar recipe was prepared utilizing santocure as the activating agent. The recipe is closely similar to that of Example 2 as shown in the following Table IV.

TABLE IV

| | |
|---|---|
| Polymer | 100.0 |
| Zinc oxide | 5.0 |
| Stearic acid | 1.0 |
| SRF black | 50.0 |
| VB-1 | 2.0 |
| Sulfur | 1.0 |
| Santocure | 2.0 |

| | | | | |
|---|---|---|---|---|
| Tensile—Mod. at 300—Elong.: | | | | |
| Scorch cured | 40'/227° F | 900 | 70 | 1,010 |
| | 60'/227° F | 1,120 | 60 | 1,020 |
| | 5'/307° F | 1,100 | 110 | 980 |
| Cured | 10'/307° F | 1,450 | 250 | 890 |
| | 20'/307° F | 1,650 | 400 | 780 |
| | 40'/307° F | 1,830 | 810 | 730 |

In the above table, the material identified as VB-1 is para-quinone dioxime, and the material identified as SRF black is a good grade of semi-re-inforcing furnace black.

Samples of the material compounded according to the above recipe were also cured under pressure of time intervals of 40 and 60 minutes at 227° F., and for 5, 10, 20 and 40 minutes at 307° F., to show the absence of scorchiness and the highly efficient curing action at normal curing temperatures.

EXAMPLE 4

A similar recipe was used containing considerably larger quantities of zinc oxide as shown in the following Table V.

TABLE V

| | |
|---|---|
| Polymer | 100.0 |
| Stearic acid | 1.0 |
| SRF black | 50.0 |
| VB-1 | 2.0 |
| Altax | 4.81 |
| ZnO | 10.0 |

Tensile—Elong.—Mod. at 300:

| | |
|---|---|
| Cured 40'/227° F | 490–1,100+–110 |
| Cured 60'/227° F | 810–1,100–110 |
| Cured 10'/287° F | 1,300–720–480 |
| Cured 20'/287° F | 1,270–700–520 |
| Cured 40'/287° F | 1,270–700–530 |
| Cured 80'/287° F | 1,300–600–630 |

In this table as before, SRF black is a good grade of semi reinforcing furnace carbon black, and VB-1 is para-quinone dioxime. This table also shows very well, the low scorchiness of the compound and the excellent curing properties at normal curing temperatures.

EXAMPLE 5

Not only to the compounds of the invention show excellent physical properties, but they show excellent aging properties at elevated temperatures and high oxygen pressures. A series of recipes were prepared as shown in Table VI, utilizing one of the activators (Altax) as shown, with and without sulfur, and conventional acceleration with and without the quinone dioxime. These several compounds as shown by the recipes were prepared in the usual manner, cured for 60 minutes at 307° F., to yield tensile strength, modulus at 300% and elongation as shown in the Table VI. Portions of the cured material were then aged at 300° F., in 100 lbs. per square inch air pressures at time intervals of 12 hours, 24, 78 and 96 hours.

It will be noted that while all of the compounds deteriorated during the aging test, the compounds in which the dioxime was activated with Altax were much superior to any of the others, and far superior to most of the elastomer compounds available to those skilled in the art.

TABLE VI

| | 9452—1 | —2 | —3 | —4 | —5 | —6 | —7 | —8 |
|---|---|---|---|---|---|---|---|---|
| Polymer | 100.0 | 100.0 | 100.0 | 100.0 | 100.0 | 100.0 | 100.0 | 100.0 |
| Zinc oxide | 10.0 | 10.0 | 10.0 | 10.0 | 10.0 | 10.0 | 10.0 | 10.0 |
| Stearic acid | 2.0 | 2.0 | 2.0 | 20.0 | 2.0 | 2.0 | 2.0 | 2.0 |
| S. R. F. black | 54.0 | 54.0 | 54.0 | 54.0 | 54.0 | 54.0 | 54.0 | 54.0 |
| Forum 40 | 5.0 | 5.0 | 5.0 | 5.0 | 5.0 | 5.0 | 5.0 | 5.0 |
| VB-1 | 2.0 | 2.0 | 2.0 | 2.0 | 2.0 | 2.0 | | 2.0 |
| Agerite powder | .5 | .5 | .5 | .5 | .5 | .5 | .5 | .5 |
| Altax | 4.0 | 4.0 | | | | | | |
| Tuads | | | 3.0 | 3.0 | 3.0 | 3.0 | 3.0 | 3.0 |
| Sulfur | | 1.5 | 0.5 | 1.0 | 1.5 | 2.0 | 1.5 | |
| Tensile—Mod. at 300—Elong. cured 60'/307° F | 1210-765-560 | 1410-1130-450 | 1290-545-590 | 1280-675-560 | 1140-755-480 | 1280-710-530 | 1340-475-600 | 1340-410-710 |
| After aging at 300°F. and 100#/in.² air: | | | | | | | | |
| 12 hours | 1080-1010-330 | 1300- -290 | 930-630-550 | 850-665-480 | 930-760-440 | 860-735-400 | 835-505-530 | 1050-510-690 |
| 24 hours | 945-930-310 | 1000-1000-300 | 700-515-620 | 635-410-540 | 580-450-450 | 490-375-430 | 685-420-590 | 775-400-690 |
| 48 hours | 900-900-300 | 805-750-320 | 220-110-570 | 95-75-570 | 175-105-580 | 135-55-550 | 515-320-580 | 360-155-690 |
| 72 hours | 925-905-320 | 650-565-350 | 90-55-540 | 55- -650 | 55-55-570 | 55-55-610 | 265-170-500 | 140-55-600 |
| 96 hours | 855-820-320 | 585-565-430 | (¹) | (¹) | (¹) | (¹) | (¹) | (¹) |

¹ Too poor to test.

EXAMPLE 6

The prior examples show the improvement in rate of cure and the reduction in scorchiness obtainable by the composition of the present invention. In addition, the elimination of metal salts makes possible the preparation of a very high dielectric constant, high electric strength rubber insulation, which is also of low scorchiness and very quick curing, thereby being very well adapted to use for electrical insulating purposes generally. The compounding recipe desirably contains the polymer, small quantities of stearic acid, small quantities of zinc oxide (which is a non-conductor in rubber insulation material), and desirably contains a clay pigment such as fine particle, processed clay, especially "Whitetex," or other non-conducting pigments. In the preparation of this compound, the polymer is placed on the warm mill, banded, and the auxiliary ingredients added as usual. The mill may be run at high speed and somewhat higher temperature than usual to permit of the rapid preparation of successive batches without trouble from scorchiness.

The compound is then put into a hot extruder and extruded around the desired conductor, which may be a single wire or may be a bundle of cabled wires. The wire may be tinned as desired, but this is not necessary, since there is no tendency for reaction between the copper and the polymer or any of the compounding agents. The wire may also be given a serving of thread or a covering of braid if desired, but again this is not necessary, since the rubber adheres satisfactorily to the conductor. The wire with the extruded covering of polymer compound is then passed into an open steam vulcanizing chamber (through a labyrinth seal) at a steam pressure preferably between 150 and 300 lbs. per square inch. At such temperatures the curing occurs very rapidly, so that a set cure is obtained within a few seconds, permitting the covered wire to be drawn over pulleys of fair radius within the curing tube, and the cure may be complete in from 30 to 60 seconds, thereby permitting extrusion speeds of from 50 to 200 feet per minute or even higher, depending upon the curing temperature, the length of the open steam curing tube, and similar factors (alternatively, of course, the polymer-coated conductor may be cured within an electrically heated tube at temperatures ranging from 300 to 450° F.)

A suitable compounding recipe is:

| | |
|---|---|
| Polymer | 100 |
| Zinc oxide | 5 |
| Stearic acid | 2 |
| Sulfur | 2 |
| p-Quinone dioxime | 2 |
| Benzothiazyl disulfide | 4 |
| Clay (Whitetex) | 135 |

Samples of this compound were cured for thirty minutes at 287° F., and the physical properties determined, after which other specimens were aged in the Geer oven and in the oxygen bomb to yield the following results as shown in Table VII.

TABLE VII

| | |
|---|---|
| Original: | |
| Tensile—Elongation | 690-540 |
| Mod. at 200%—Shore | 440- 64 |
| Aged Geer Oven 7 days at 158° F.: | |
| Tensile—Elongation | 570-470 |
| Mod. at 200%—Shore | 450- 70 |
| Aged oxygen bomb 7 days at 158° F.: | |
| Tensile—Elongation | 690-330 |
| Mod. at 200%—Shore | 610- 72 |
| Permanent set | 14/64" |

Electrical properties

Electrical properties were determined on stocks cured 30 minutes at 287° F. All the mixes showed very good power factor and dielectric constant characteristics at one kilocycle. The power factor ranged from .0025 to .0036 and the dielectric constant from 2.70 to 2.89. The increase in these properties after immersion seven days in water at room temperature was moderate, giving values of .0048 to .0125 and 2.82 to 3.01 respectively. There appeared to be no correlation with the mixing technique.

It may be noted that these samples were cured at a relatively low temperature. A considerably higher temperature for a much shorter time yields equally cured good results and in thin sections at 400° F., rather than the 280° suggested, the curing is complete in approximately 60 seconds. These results show the high value of the material according to the present invention for electrical insulation.

Thus, the process of the invention compounds, into an elastomer, a sufficient amount of a quinone dioxime substance to cure the elastomer together with the usual rubber additive agents, and in addition, an organic poly-sulfide compound having a sufficiently high chemical reactivity to over-power the reactivity of the dioxime at temperatures below 250° F., to avoid the tendency to scorchiness otherwise characteristic of the dioximes as curing agents, and thereafter heating the material to curing temperature for a sufficient length of time to yield a state of cure.

While there are above disclosed but a limited number of embodiments of the process and apparatus of the present invention, it is possible to provide still other embodiments without departing from the inventive concept herein disclosed, and it is therefore desired that only such limitations be imposed upon the appended claims as are stated therein or required by the prior art.

The invention claimed is:

1. A composition of matter comprising in combination an elastomer containing a major proportion of isobutylene copolymerized with a minor proportion of a multiolefin having from 4 to 14, inclusive, carbon atoms per molecule, characterized by a Staudinger molecular weight number within the range between 30,000 and 60,000, an iodine number within the range between 0.5 and 175, and reactivity with sulfur in a curing reaction, together with amounts of a substance containing a quinonoid nucleus within the range between 0.5 parts and 5 parts per hundred of elastomer and from 0.5 parts to 5 parts of a thiazyl compound selected from the group consisting of 2,2'-benzothiazyl disulfide and benzothiazyl-2-monocyclohexyl sulfenamide.

2. A composition of matter comprising in combination an elastomer containing a major proportion of isobutylene copolymerized with a minor proportion of a multiolefin having from 4 to 14, inclusive, carbon atoms per molecule, characterized by a Staudinger molecule weight number within the range between 30,000 and 60,000, an iodine number within the range between 0.5 and 175, and reactivity with sulfur in a curing reaction, together with amounts of a substance containing a para-quinone dioxime nucleus within the range between 0.5 parts and 5 parts per hundred of elastomer and from 0.5 parts to 5 parts of 2,2' benzo-thiazyl-disulfide.

3. A composition of matter comprising in combination an elastomer containing a major proportion of isobutylene copolymerized with a minor proportion of a conjugated diolefin of 4 to 6 carbon atoms per molecule, characterized by a Staudinger molecular weight number within the range between 30,000 and 60,000, an iodine number within the range between 0.5 and 175, and reactivity with sulfur in a curing reaction, together with amounts of a para-quinone dioxime within the range between 0.5 parts and 5 parts per hundred of elastomer and from 0.5 parts to 5 parts of benzo-thiazyl-2-mono-cyclo-hexyl-sulfenamide.

4. In the compounding of an elastomer prepared by the steps of copolymerizing a major proportion of isobutylene with a minor proportion of a multiolefin having from 4 to 14, inclusive, carbon atoms per molecule at a temperature within the range between —40° C., and —103° C., by the application thereto of a Friedel-Crafts active metal halide catalyst in solution in a low freezing non-complex forming solvent, the steps in combination of milling 100 parts of the polymer to plasticity at a temperature within the range between 160° F., and 250° F., adding thereto at that temperature both 0.5 to 5 parts of a quinone dioxime and about 0.5 to 2 parts of sulfur and from 0.5 part to 5 parts of a thiazyl compound selected from the group consisting of 2,2'-benzothiazyl disulfide and benzothiazyl-2-monocyclohexyl sulfenamide.

5. In the compounding of an elastomer prepared by the steps of copolymerizing a major proportion of isobutylene with a minor proportion of isoprene at a temperature within the range between —40° C., and —103° C., by the application thereto of a Friedel-Crafts active metal halide catalyst in solution in a low freezing non-complex forming solvent, the steps in combination of milling 100 parts of the polymer to plasticity at a temperature within the range between 160° F., and 250° F., adding thereto at that temperature both a quinone dioxime and from 0.5 part to 5 parts of 2,2'-benzo-thiazyl-disulfide.

6. In the compounding of an elastomer prepared by the steps of copolymerizing a major proportion of isobutylene with a minor proportion of a conjugated diolefin of 4 to 6 carbon atoms per molecule at a temperature within the range between —40° C., and —103° C., by the application thereto of a Friedel-Crafts active metal halide catalyst in solution in a low freezing non-complex forming solvent, the steps in combination of milling 100 parts of the polymer to plasticity at a temperature within the range between 160° F., and 250° F., adding thereto at that temperature both a quinone dioxime and from 0.5 part to 5 parts of benzo-thiazyl 2-monocyclo-hexyl-sulfenamide.

FRANCIS P. BALDWIN.
WINTHROPE C. SMITH.

REFERENCES CITED

The following references are of record in the file of this patent:

UNITED STATES PATENTS

| Number | Name | Date |
| --- | --- | --- |
| 2,269,230 | Savage et al. | Jan. 6, 1942 |
| 2,356,128 | Thomas et al. | Aug. 22, 1944 |
| 2,391,742 | Roberts | Dec. 25, 1945 |
| 2,393,321 | Haworth | Jan. 22, 1946 |
| 2,402,503 | McCutchan | June 18, 1946 |
| 2,402,504 | McCutchan | June 18, 1946 |
| 2,427,514 | Sterrett et al. | Sept. 16, 1947 |
| 2,440,899 | Harvey | May 4, 1948 |
| 2,471,752 | Ingmanson | May 31, 1949 |